(12) United States Patent
Fan et al.

(10) Patent No.: US 6,469,071 B1
(45) Date of Patent: Oct. 22, 2002

(54) RADIATION CURABLE ACRYLATE-TERMINATED POLYMERS HAVING POLYCARBONATE REPEATING UNITS

(75) Inventors: Mingxin Fan, West Chester, PA (US);
Gary Ceska, West Chester, PA (US);
James Horgan, West Chester, PA (US);
Robert Adams, Brookhaven, PA (US);
William Schaeffer, Glenmoore, PA (US); Josh Oliver, Exton, PA (US)

(73) Assignee: Sartomer Technology Company, Inc., Wilmington, DE (US)

( * ) Notice: Subject to any disclaimer, the term of this patent is extended or adjusted under 35 U.S.C. 154(b) by 18 days.

(21) Appl. No.: 09/835,240

(22) Filed: Apr. 13, 2001

(51) Int. Cl.$^7$ .............................. C08F 2/48; C08F 18/24; C07C 69/96; B32B 9/04
(52) U.S. Cl. ...................... 522/183; 522/182; 522/163; 522/104; 522/107; 522/108; 428/411.1; 428/412; 428/492; 428/480; 428/500; 558/267; 558/260; 558/263; 558/264; 558/277; 526/314; 526/317.1; 525/10; 525/11; 525/31; 525/41
(58) Field of Search .................................. 558/267, 260, 558/263, 264, 277; 526/314, 317.1; 528/370, 371; 525/10, 11, 31, 41; 522/163, 178, 104, 179; 182/107, 108, 183; 428/411.1, 412, 480

(56) References Cited

U.S. PATENT DOCUMENTS

| | | | | |
|---|---|---|---|---|
| 4,255,243 A | * | 3/1981 | Coqueugniot et al. | 522/14 |
| 4,264,752 A | * | 4/1981 | Watson, Jr. | 522/90 |
| 4,530,747 A | | 7/1985 | Donges et al. | 522/121 |
| 4,691,045 A | * | 9/1987 | Fukuchi et al. | 560/185 |
| 4,783,544 A | * | 11/1988 | Yokoshima et al. | 385/128 |
| 5,143,997 A | * | 9/1992 | Endo et al. | 522/135 |
| 5,178,952 A | * | 1/1993 | Yamamoto et al. | 428/425.8 |
| 6,238,840 B1 | * | 5/2001 | Hirayama et al. | 430/280.1 |

* cited by examiner

*Primary Examiner*—James J. Seidleck
*Assistant Examiner*—Sanza L. McClendon
(74) *Attorney, Agent, or Firm*—Michael B. Fein; Cozen O'Connor

(57) ABSTRACT

Polyester based polycarbonate (meth)acrylates prepared by the reaction of a alkylene or arylene diol polycarbonate with an anhydride or its dicarboxylic acid to form a carboxyl terminated diester, reacting the diester with a diglycidyl ether and an acrylic or methacrylic acid to form an acrylate terminate polymer which is useful for radiation cured coatings which have superior adhesion and reverse impact strength when applied to plastic substrates.

14 Claims, No Drawings

RADIATION CURABLE ACRYLATE-TERMINATED POLYMERS HAVING POLYCARBONATE REPEATING UNITS

BACKGROUND OF THE INVENTION

This present invention relates to the field of radiation curable polymers, particularly to acrylate terminated, radiation curable polymers useful for coatings.

There have been many proposals for radiation curable coating polymers. Among the most commercially successful of such proposals are the epoxy acrylates, the polyester acrylates, and the urethane acrylates. Such acrylates have the advantages of having very low volatile organic compounds (VOC) as well as high productivity. Ultraviolet (UV) and electron beam (EB) are the most typical forms of radiation which are used to generate free radicals which initiate the polymerization or cure. While almost instant cure results in the high productivity, it also makes it difficult to achieve good adhesion, especially to difficult substrates such as polycarbonate (PC) and polyvinyl chloride (PVC). This problem is due in part to the lack of time for the cured matrix to relax.

Polycarbonate-containing acrylate-containing polymers having a single polycarbonate moiety have been suggested by Yamamoto, et al., U.S. Pat. No. 5,178,952; Coqueugniot, et al., U.S. Pat. No. 4,255,243; Watson, Jr., U.S. Pat. No. 4,264,752 and Endo, et al., U.S. Pat. No. 5,143,997. However, such prior art polymers were not reported as having good adhesion or weathering properties.

SUMMARY OF THE INVENTION

It is an object of the present invention to provide radiation curable acrylic coating polymers which have adhesion properties on plastic substrates which are superior to the state of the art.

It is another object of the invention to provide polymers which can be UV or EB cured on plastic substrates and provide coatings which have excellent impact strength as well as adhesion properties.

These objects, and others which will become apparent from the following disclosure, are achieved by the present invention which comprises in one aspect a polymer of the formula (I)

wherein (Acr)$_y$A is an acrylate or methacrylate functional residue of a carboxylic acid containing acrylic or methacrylic monomer; y is the number of acrylate or methacrylate groups.

PC is the residue of an alkylene or arylene diol polycarbonate of the formula (II)

in which R' is one or more ($C_2$ to $C_{10}$) alkylene or one or more ($C_6$ to $C_{12}$) aromatic group;

X is from 0 to 20;

y is an integer from 1 to 5;

n is an integer from 1 to 10,000.

R is a divalent organic linking group, a residue from diepoxide;

DE is a diester linking group derived from the residue of an anhydride or its dicarboxylic acid;

DE and PC are connected by an ester group;

R and DE are connected by an ester group;

A and R are connected by an ester group.

In another aspect, the invention comprises a process of preparing the polymers of formula (I) comprising reacting an alkylene or arylene diol polycarbonate with an anhydride or its dicarboxylic acid to form a carboxyl terminated diester, and reacting the diester with a diglycidyl ether and an acrylic or methacrylic monomer containing a carboxylic acid group.

A still further aspect of the invention is a coating prepared by curing polymer of formula (I) by applying it to a substrate and curing in the presence of UV or EB radiation, the process of preparing the coating, and coated articles.

The polymers can be used alone or in combination with other free radically polymerizable materials such as allyl monomers and oligomers or (meth)acrylate monomers and oligomers. The coatings of the invention show excellent physical properties such adhesion, reverse impact strength, and weathering.

DETAILED DESCRIPTION OF THE INVENTION

According to the present invention there is provided a process for the preparation of polycarbonate based resins. These resins are useful in coating compositions, especially in coatings on plastic substrates where good adhesion is difficult to achieve.

The arkylene or arylene polycarbonate diols of formula (II) can be reacted with an anhydride or dicarboxylic acid derivative thereof to form a diester with two terminal carboxylic acid groups. The residue of such diol is designated as PC in formula (I). Suitable classes of such polycarbonate diols include hexanediol base polycarbonate diols, pentanediol based polycarboante diols, cyclohexanedimthanol based polycarbonate diols, and mixed alcohol polycarbonate diols and polyols.

The condensation reaction between the polycarbonate and the anhydride or dicarboxylic acid monomer can be carried out with or without catalysts. Catalyzed reactions are preferred due to the short reaction time and less side products. Typical catalysts which can be used are amines and/or tin-based catalysts. Some catalyst examples are dibutyltin dilaurate, 1,4-diazabicyclo[2.2.2]-octane (DABCO), 1,8-diazabicyclo-[5.4.0]-undec-7-ene (DBU), N,N-dimethylcyclohexylamine (DMCA), tetramethyltin, tetrabutyltin, tetraoctyltin, tributyltin chloride, dibutyltin dichloride, dibutyltin oxide, dibutyltin diacetate, butyltin trichloride, dioctyltin dichloride, dioctyltin oxide, dioctylton dilaurate, dioctyltin diacetae. Other suitable catalysts are zinc, iron, bismuth, and zirconium complexes.

The anhydride or dicarboxylic acid forms a diester linking group and is designated DE in formula (I). Some acid anhydride examples are succinic anhydride, phthalic anhydride, tetrahydrophthalic anhydride, hexahydrophthalic anhydride, methylhexahydrophthalic anhydride, and maleic anhdride. Dicarboxylic acid derivatives of such anhydrides are suitable but less preferred because of the water of condensation which must be removed in the case of the dicarboxylic acids but not in the case of the anhydrides.

The diglycidyl ether monomers form a divalent organic linking group and their residue is designated R in formula (I). Suitable diglycidyl ether monomers are aromatic or aliphatic in nature. Suitable classes of such diglycidyl ethers are bisphenol A based diglycidylethers, butanediol diglycidylether, hexanediol diglycidyl ethers, bisphenol F diglycidyl ethers, polypropyleneglycol based diglycidyl ethers, and polycarbonatediol based glycidyl ethers.

The acid functional (meth)acrylic monomers are monofunctional or multifunctional, and form terminal groups $(Acr)_yA$ in formula (I). Preferred ones include acrylic or methacrylic acid, and adducts of hydroxyethyl acrylate and succinic anhydride, hydroxyethyl methacrylate and succinic anhydride, hydroxyethyl acrylate and phthalic anhydride, and hydroxypropyl acrylate and hexahydrophthalic anhydride.

Typical molar ratios of polycarbonate diol and cyclic anhydride or its diacid are from 1.1/1.0 to 1.0/2.0, in the case of 1.0/2.0 ratio there is no repeating units formed during the reaction. The reactions can be carried out from room temperature to 150° C., and the preferred temperatures are from 80 to 120° C. The higher temperature will reduce the reaction mixture viscosity, which make the stirring easier, especially when the molecular weight is high. Preferred weight average molecular weight of the polymers is about 300 to 100,000.

EXAMPLES

The following non-limiting examples illustrate a few embodiments of the invention.

Example 1

Preparation of Polycarbonate Polyester Acrylate 92.5 grams of polycarbonate diol (polyhexanediol carbonate, MW 1850) and 10.0 grams of succinic anhydride was reacted at 95° C. for 6 hours. To the resulted resin, 2.6 grams of acrylic acid, 26.0 grams of butanediol diglycidyl ether, and 0.7 gram of triphenylphosphine were added, the final mixture was heated to 100° C. for 6 hours, a light yellow resin was obtained with a viscosity of 17,000 cps at 65° C.

Example 2

Polycarbonate Based Acrylate Oligomers in UV Radiation Curing

The resin prepared in Example 1 was tested in UV radiation cure by blending the neat resin with 3% photoinitiator (Irgacure 1700 brand from Ciba Specialties) and applying to various substrates using a #10 application wire rod and then curing the coated substrates on a UV curing unit equipped with a 300 watts/inch Hg lamp at a speed of 50 feet per minute (fpm). The cured coatings were tested for adhesion and reverse impact strength and compared to conventional acrylate coatings.

TABLE I

| Component | Formulations Wt. % | | | | |
|---|---|---|---|---|---|
| | 1 | 2 | 3 | 4 | 5 |
| CN120* | 100 | | | | |
| CN293* | | 100 | | | |
| CN978* | | | 100 | | |
| Example 1 | | | | 100 | 100 |

Comparative (*) examples were prepared with the following acrylate resins:
1) CN120, an epoxy acrylate resin based on bisphenol A diglycidyl ether marketed by Sartomer Company.
2) CN293, an aliphatic hexafunctional polyester acrylate resin prepared from acrylic acid, dimer fatty acid marketed by Sartomer Company.

TABLE I-continued

| Component | Formulations Wt. % | | | | |
|---|---|---|---|---|---|
| | 1 | 2 | 3 | 4 | 5 |

3) CN978, a urethane acrylate oligomer prepared from polyether polyol, hydroxyethyl acrylate and toluene diisocyante marketed by Sartomer Company.

TABLE II

| Physical Properties of the Cured Films | | | | |
|---|---|---|---|---|
| Film # | PC | PVC | Polystyrene | Reverse Impact (lbs · in) |
| 1 | 0 | 0 | 100 | 5 |
| 2 | 5 | 0 | 100 | 0 |
| 3 | 0 | 12 | 95 | 40 |
| 4 | 100 | 100 | 100 | >80 |

The adhesion numbers are % remain in the crosshatch test.

The reverse impact test numbers are the products of weight and the heights.

As shown in Table II, the resins of the invention are much better in impact strength and adhesion to plastic substrates.

The foregoing discussion discloses and describes merely exemplary embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. Polymer of the formula (I)

$$(Acr)_yA\text{—}R\text{—}DE\text{—}(PC)[(DE)(PC)]_x\text{—}DE\text{—}R\text{—}A(Acr)_y \quad (I)$$

wherein $(Acr)_yA$ is an acrylate or methacrylate functional residue of a carboxylic acid containing acrylic or methacrylic monomer; y is the number of acrylate or methacrylate groups.

PC is the residue of an alkylene or arylene diol polycarbonate of the formula (II)

$$HO(R'OCOO)_nR'OH \quad (II)$$

in which R' is one or more ($C_2$ to $C_{10}$) alkylene or one or more ($C_6$ to $C_{12}$) aromatic group;

X is from 0 to 20;

y is an integer from 1 to 5;

n is an integer from 1 to 10,000.

R is a divalent organic linking group, a residue from the diepoxide;

DE is a diester linking group derived from the residue of an anhydride or its dicarboxylic acid;

DE and PC are connected by an ester group;

R and DE are connected by an ester group;

A and R are connected by an ester group.

2. Polymer of claim 1 having a weight average molecular weight of 300 to 100,000.

3. Polymer of claim 1 wherein the DE is derived from an anhydride selected from the group consisting of succinic anhydride, phthalic anhydride, tetrahydrophthalic anhydride, hexahydrophthalic anhydride, methylhexahydrophthalic anhydride, and maleic anhdride.

4. Polymer of claim 1 wherein the R is derived from a diglycidyl ether selected from the group consisting of bisphenol A based diglycidylethers, butanediol diglycidylether, hexanediol diglycidyl ethers, bisphenol F diglycidyl ethers, polypropyleneglycol based diglycidyl ethers, and polycarbonatediol based glycidyl ethers.

5. Polymer of claim 1 wherein said (Acr)yA is derived from a monomer selected from the group consisting of acrylic acid, methacrylic acid, and a reaction product of a hydroxyalkyl acrylate and an anhydride.

6. Polymer of claim 1 wherein R' is selected from the group consisting of hexamethylene, pentane, cyclohexane, ethane, propane, butane, cyclohexanedimethyl.

7. Process of preparing a polymer of formula (I) comprising reacting an alkylene or arylene diol polycarbonate with an anhydride or its dicarboxylic acid to form a carboxyl terminated diester, and reacting the diester with a diglycidyl ether and an acrylic or methacrylic monomer containing a carboxylic acid group.

8. Process of claim 7 wherein the reaction of said polycarbonate and said anhydride or its dicarboxylic acid is conducted in the presence of a catalyst selected from tin compounds and amine based compounds and said diester and said diglycidyl ether and acrylic or methacrylic acid are reacted in the presence of a catalyst selected from the group consisting of amines, ammonium salts, triphenylphosphine, transition metal complexes.

9. Radiation curable compositions prepared by curing polymer of formula (I) by applying it to a substrate and curing in the presence of UV or EB radiation.

10. Process of coating plastic substrates comprising applying a polymer of claim 1 to a substrate and curing in the presence of UV or EB radiation.

11. Process of claim 10 further comprising blending said polymer with a photoinitiator prior to applying to said substrate.

12. Process of claim 10 wherein said substrate is a plastic selected from the group consisting of polyvinyl chloride, polycarbonate, polystyrene, and polyester.

13. Article comprising a substrate coated according to the process of claim 9.

14. Article of claim 13 wherein said substrate is selected from the group consisting of polyvinyl chloride, polycarbonate, polystyrene, and polyester.

* * * * *